(No Model.)

G. B. SCHOEPF.
ROAD VEHICLE.

No. 364,862. Patented June 14, 1887.

Witnesses
Thomas Cross
J. W. Lane

Inventor
Geo. B. Schoepf
By his Attorney
A. G. Kuhlman

N. PETERS, Photo-Lithographer, Washington, D. C.

ated text below.

UNITED STATES PATENT OFFICE.

GEORGE B. SCHOEPF, OF MADISON, MINNESOTA.

ROAD-VEHICLE.

SPECIFICATION forming part of Letters Patent No. 364,862, dated June 14, 1887.

Application filed October 13, 1886. Serial No. 216,169. (No model.)

*To all whom it may concern:*

Be it known that I, GEORGE B. SCHOEPF, a citizen of the United States of America, residing at Madison, in the county of Lac Qui Parle, in the State of Minnesota, have invented a new and useful Road-Vehicle, of which the following is a specification.

My invention has relation to improvements in road-vehicles, and especially to that class of light-running buggies wherein the body of the vehicle is supported by side springs fixed and arranged in a supporting-frame clipped to the axles, and the object is to provide a vehicle with an improved spring-frame which will give greater ease and comfort to the rider.

My invention therefore consists in the novel construction of parts and their combination, as will be hereinafter more fully described, and specially pointed out in the claims hereto.

I have fully illustrated my improvements in the accompanying drawings, forming a part of this specification, wherein—

Figure 1:
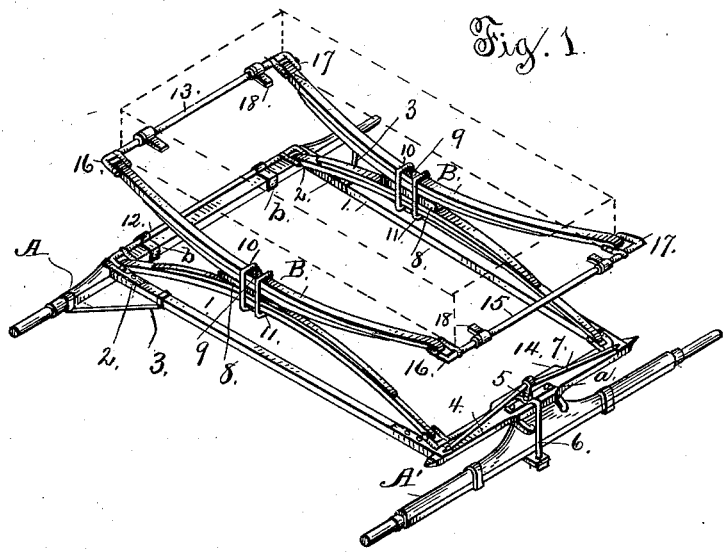
Figures 2, 3:
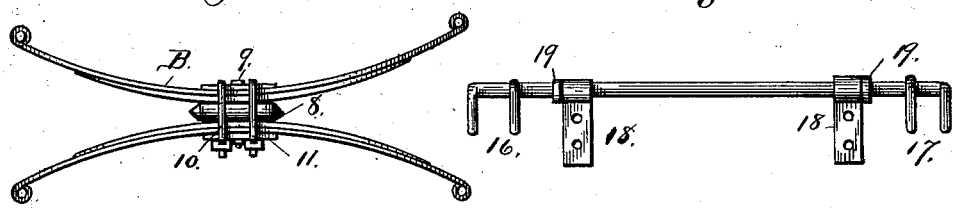
Figures 4, 5:
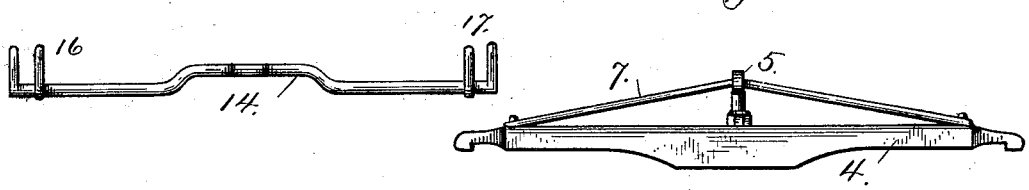

Figure 1 is a perspective view of the spring and spring-frame with the body arranged thereon and the frame clipped to the axles and head-block. Fig. 2 is a detail view of one of the springs. Fig. 3 is a detail view of one of the cross-bars which connects the ends of the opposite springs and showing the bracket-pieces which sustain the body. Fig. 4 is a view of the under cross-bar which connects the front end of the lower pair of springs, and Fig. 5 is a view of the head-block with truss-rod arranged thereon.

In the drawings like notations designate like parts, and, reference being had thereto, the letter A designates the hind axle, and A' the front axle, of the vehicle, which elements are of the usual approved construction. To the hind axle are firmly clipped the rear ends of the side bars, 1, substantially as seen at 2, and to prevent displacement and give the frame turning and pulling functions braces 3 are fixed to the side bars with their other ends secured to the axle close to the shoulders of the spindles. The front ends of the side bars are secured to the ends of the head-block 4 by clips or other proper fastenings. This head-block 4 is provided with a bolt-hole in the middle to take the king-bolt 5, and has fixed to its under face the rubber plate of the fifth-wheel. A suitable keeper, 6, secures the axle and head-block in relative positions, as shown, and a top-plate, *a*, with bolt-hole on the head-block, serves to keep the king-bolt from wearing the bolt-hole and strengthens the head-block. The head of the king-bolt is projected and perforated, and through this perforation is passed a truss-rod, 7, which has the ends secured to the ends of the head-block. This arrangement of the truss-rod arches it and braces the head-block, which is requisite, since it bears part of the weight of the body of the vehicle with its occupants.

The letters B designate the springs, which are leaf-springs, semi-elliptical in form, and secured together in the middle in reverse arrangement. Between the springs of each set is set a plate of wood, 8, and a central bolt, 9, is passed through the springs and through the wooden block or plate, and a nut on the end of the bolt forms the fastening means. To give requisite and additional fastening means at this part, I clip the springs and plate together, as seen at 10 11, the clips being arranged on each side of the fastening-bolt and near the ends of the interposed wooden plate. This connection relieves the fastening-bolt of strain which would otherwise be imposed on it, and the interposed wooden block or plate serves as a seat for the springs, to which seat the springs are held by means of the clips. The opposite ends of the respective springs are connected by cross-bars 12 13 14 15. These cross-bars are formed with rigid arms 16 17, projected at right angles from the bar, and having their free ends formed with bolt-holes to receive the bolt or pivot to which the ends of the springs are secured, substantially as seen in the drawings. The ends of the springs are linked or journaled to the bolts of these arms of the cross-bars, and thus I secure the frame square, and at the same time a general springing movement is imparted to the whole construction. The cross-bar 12, being the lower rear one, is secured in place over the hind axle by clips *b*, having sleeves at the top, in which the cross-bar is seated and, to the limit allowed by connection with the springs, may be turned. The lower front cross-bar, 14, is struck up in the middle to set over the keeper of the king-bolt, and is clipped to the head-block similar to the connections of the lower rear cross-bar to the axle, and the spring's ends are secured in the arms of the cross-bar, as in the rear cross-bar. The cross-bars 13 and 15 are secured to the respective ends of the upper set of springs by having the ends of the springs attached to the bolts of the arms of the cross-bars. On each of the upper cross-bars are swiveled bracket-pieces 18, which are limited in their side displacement by annular shoulders 19 on the cross-bars. The plates of these bracket-pieces are secured to the bottom of the body of the vehicle by any well-known means. These cross-bars not only keep the frame in due position, but they give to the whole device a resiliency which induces integrity in the parts and pleasure to the rider.

What I claim as my invention, and desire to secure by Letters Patent, is—

1. The combination of the hind axle, the side bars having their hind ends secured to the hind axle, the head-block having the forward ends of the side bars secured thereto, and a truss-rod passed through the head of the king-bolt and its ends secured to the ends of the head-block, substantially as described.

2. The spring-frame for a road-vehicle herein described, consisting of semi-elliptical side springs secured together in reverse position, end cross-bars formed with projecting arms arranged at right angles to the cross-bar, and means projected through the ends of said arms and the ends of the springs for holding the springs to the cross-bars, all substantially as described.

3. The spring-frame for a road-vehicle herein described, consisting of semi-elliptical side springs secured together in reverse position and cross-bars formed with projecting arms arranged at right angles to the cross-bars, means, substantially as described, for connecting said arms and the ends of the springs, and means, substantially as described, on the upper cross-bars for securing the frame to the body of the vehicle, as specified.

In witness whereof I have hereunto set my hand, in the presence of two attesting witnesses, this 7th day of October, 1886.

GEORGE B. SCHOEPF.

Attest:
J. A. SORLEY,
J. O. KELLY.